United States Patent Office 2,938,922
Patented May 31, 1960

2,938,922
N-NITROSO-N-ARYL ARYLENEDIAMINES

Ching C. Tung, Kirkwood, Mo., assignor to Monsanto Chemical Company, St. Louis, Mo., a corporation of Delaware No Drawing. Filed Jan. 17, 1958, Ser. No. 709,481

8 Claims. (Cl. 260—576)

The present invention relates to new compounds having valuable properties for rubber compounding. The compounds of this invention are N-nitroso-p-arylenediamines having in addition to at least one nitroso substituent an aryl radical on one nitrogen and an aliphatic radical on the other. By aliphatic substituent is meant non aromatic substituents including both acyclic and alicyclic substituents.

The new compounds may be represented by the structure

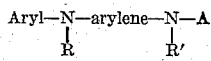

where R and R' represent hydrogen or nitroso at least one of which is nitroso and A represents an aliphatic radical, as for example cyclohexyl, 2-methylcyclohexyl, 3,5-dimethylcyclohexyl, 3,3,5-trimethylcyclohexyl, 4-methylcyclohexyl, 4-nonylcyclohexyl, cyclopentyl, methyl, ethyl, propyl, isopropyl, butyl, isobutyl, sec. butyl, amyl, isoamyl, hexyl, heptyl, octyl, decyl and dodecyl. Benzyl radicals are predominately aliphatic in nature and while contemplated, are distinctly less desirable.

More particularly, examples of the new compounds comprise the following although these are to be understood as illustrative only:

N,N'-dinitroso-N-cyclohexyl - N' - phenyl-p-phenylenediamine
N,N'-dinitroso - N - 2 - methylcyclohexyl - N' - phenyl-p-phenylenediamine
N,N'-dinitroso-N-3,5-dimethylcyclohexyl - N' - phenyl-p-phenylenediamine
N,N'-dinitroso-N-3,3,5-trimethylcyclohexyl - N' - phenyl-p-phenylenediamine
N,N'-dinitroso - N - 4 - methylcyclohexyl - N' - phenyl-p-phenylenediamine
N,N'-dinitroso-N-4-nonylcyclohexyl - N' - phenyl-p-phenylenediamine
N,N'-dinitroso-N-cyclopentyl-N'-phenyl - p - phenylenediamine
N,N'-dinitroso-N-cyclohexyl-N' - phenyl-1,4-naphthalenediamine
N,N'-dinitroso-N-methyl-N'-phenyl-p-phenylenediamine
N,N'-dinitroso-N-ethyl-N'-phenyl-p-phenylenediamine
N,N'-dinitroso-N-propyl-N'-phenyl-p-phenylenediamine
N,N'-dinitroso - N - isopropyl - N' - phenyl-p-phenylenediamine
N,N'-dinitroso-N-butyl-N'-phenyl-p-phenylenediamine
N,N'-dinitroso-N-isobutyl-N'-phenyl-p-phenylenediamine
N,N'-dinitroso-N-sec. butyl - N' - phenyl - p - phenylenediamine
N,N'-dinitroso-N-amyl-N'-phenyl-p-phenylenediamine
N,N'-dinitroso-N-hexyl-N'-phenyl-p-phenylenediamine
N,N'-dinitroso-N-heptyl-N'-phenyl-p-phenylenediamine
N,N'-dinitroso-N-octyl-N'-phenyl-p-phenylenediamine
N,N'-dinitroso-N-decyl-N'-phenyl-p-phenylenediamine
N,N'-dinitroso-N-sec. octyl-N'-phenyl-p-phenylenediamine
N-nitroso-N-isopropyl-N'-phenyl-p-phenylenediamine
N-nitroso-N-sec. butyl-N'-phenyl-p-phenylenediamine
N-nitroso-N-sec. octyl-N'-phenyl-p-phenylenediamine
N-nitroso-N-cyclohexyl-N'-phenyl-p-phenylenediamine
N-nitroso-N-cyclopentyl-N'-phenyl-p-phenylenediamine
N-nitroso-N-cyclohexyl-N'-beta-naphthyl - p - phenylenediamine
N,N'-dinitroso-N-cyclohexyl - N' - betal-naphthyl-p-phenylenediamine
N,N'-dinitroso-N-cyclohexyl-N'-p-methoxyphenyl-p-phenylenediamine
N,N'-dinitroso-N-cyclohexyl-N'-p-ethoxyphenpyl-p-phenylenediamine and
N,N'-dinitroso-N-cyclohexyl - N'-p - tolyl - p - phenylenediamine.

These compounds may be prepared from N-aryl-N'-aliphatic-p-phenylenediamines by dissolving or suspending the amine in an organic solvent, adding hydrochloric acid slightly in excess of that theoretically required to form the hydrochloride of the amine and then gradually adding sodium nitrite. During the reaction it is desirable to keep the temperature of the reaction mixture below about 20° C. N-cyclohexyl-N'-phenyl-p-phenylenediamine, 173 grams, was suspended in 1600 ml. of butanol and cooled to about —5° C. Substantially 156 ml. of concentrated hydrochloric acid was added and then 104 grams of sodium nitrite dissolved in 160 ml. of water was added gradually over a period of about 2 hours. The temperature of the reaction mixture was kept at 0° C. to —5° C. throughout. The thick reaction mixture was stirred for about an hour after the addition of the nitrite and then neutralized with 50 grams of sodium carbonate dissolved in 200 grams of water. The solid product was filtered from solution, washed with water and recrystallized from alcohol. N,N'-dinitroso-N-cyclohexyl-N'-phenyl-p-phenylenediamine was obtained as small glistening silvery crystals, M.P. 114–116° C.

Substantially 63.4 grams (0.2 molecular proportion) of N-cyclohexyl-N''-beta-naphthyl-p-phenylenediamine, M.P. 141–142° C. was suspended in 400 cc. of butanol and 42 grams of 36% hydrochloric acid added. The reaction mixture was cooled to 0–5° C. and 30.6 grams of sodium nitrite dissolved in 50 cc. of water added dropwise to the cold mixture. The nitroso-N-cyclohexyl-N''-beta-naphthyl-p-phenylenediamine was filtered from solution, washed with water and dried to yield 52 grams, M.P. 87–89° C.

Where the hydrochloride salt was insoluble in water, a convenient method for suspending it in the reaction medium was to add first to the reactor water and hydrochloric acid together with a small amount of a surface active agent, as for example, a few drops of the condensation product of tall oil fatty acids and ethylene oxide. The amine dissolved in acetone or ethanol was then added with vigorous agitation at such a rate that the temperature did not exceed 10° C. As the amine solution was added, amine hydrochloride precipitated and dispersed in the reaction medium. Sodium nitrite in water was then added at such a rate that the temperature did not exceed 10° C. The addition of sodium nitrite under these conditions will minimize the evolution of oxides of nitrogen. After completing the addition of sodium nitrite, the reaction mixture was maintained at 5–10° C. for 15 minutes, warmed to 30° C. and quenched with water and the product collected on a filter or extracted with a suitable solvent if it happened to be a liquid. Proceeding in this manner nitroso-N-cyclohexyl-N'-phenyl - p - phenylenediamine was prepared by reacting 38 grams of sodium nitrite with 133.2 grams of N-cyclohexyl-N'-phenyl-p-phenylenediamine employing 200 ml. of acetone, 50 grams of 37% hydrochloric acid and 1000 ml. of water. The product was a brown crystalline solid melting at 180–185° C. It contained 12.1% nitrogen. Increasing the sodium nitrite to 56 grams and the hydrochloric acid to 81.5 grams yielded a nitroso-N-cyclohexyl-N'-phenyl-p-phenylenediamine containing 14.5% nitrogen, melting at 80–83° C.

Approximately 60 grams of N-cyclopentyl-N'-phenyl-p-phenylenediamine was suspended in 500 ml. of butyl alcohol containing 57 grams of concentrated hydrochloric acid. A solution of 51 grams of sodium nitrite in 58 ml. of water was added to the amine hydrochloride over a period of 1½ hours while maintaining the temperature of the reaction mixture below 10° C. The reaction was allowed to proceed at this temperature for about an hour after the addition and the precipitated nitroso compound filtered from solution, washed with 1:1 methanol-water and dried to obtain 50.1 grams of N,N'-dinitroso-N-cyclopentyl-N'-phenyl-p-phenylenediamine, melting at 64–65° C. The product contained 17.9% nitrogen as compared to 18.1% calculated for $C_{17}H_{18}N_4O_2$.

Into a suitable reactor was placed 19 grams of N-isopropyl-N'-phenyl-p-phenylenediamine. 250 ml. of methyl alcohol and 30 ml. of concentrated hydrochloric acid were added and the mixture cooled to 0–10° C. and a solution of 20 grams of sodium nitrite in 20 ml. of water added over a period of about 10 minutes. The reaction mixture was stirred for about an hour after the addition and the precipitated product filtered from solution and dried. After recrystallizing from methyl alcohol the N,N' - dinitroso - N - isopropyl - N' - phenyl - p - phenylenediamine melted at 74–75° C. It contained 19.3% nitrogen as compared to 19.7% calculated for $C_{15}H_{16}N_4O_2$. The corresponding n-propyl compound prepared in similar manner from N-propyl-N'-phenyl-p-phenylenediamine melted at 105–106° C. after recrystallizing from isopropanol. It contained 19.6% nitrogen.

In similar manner N,N'-dinitroso-N-isobutyl-N'-phenyl-p-phenylenediamine was prepared from the N-isobutyl-N'-phenyl-p-phenylenediamine as yellow needles. The product, after recrystallizing from isopropanol, melted at 92–93° C. It contained 18.5% nitrogen as compared to 18.8% calculated for $C_{16}H_{18}N_4O_2$. The corresponding n-butyl compound was obtained in similar manner from N-butyl-N'-phenyl-p-phenylenediamine as a crystalline solid, M.P. 64–65° C., containing 18.3% nitrogen.

A mixture of 15 grams of N-ethyl-N'-phenyl-p-phenylenediamine, 150 ml. of methyl alcohol and 25 ml. of concentrated hydrochloric acid was cooled to 0–5° C. and an aqueous solution of 20 grams of sodium nitrite in 20 ml. of water was added portionwise over a period of 15 minutes, keeping the temperature below 10° C. The mixture was then stirred for one hour, 50 ml. of water added and the precipitated product filtered from solution and washed with water. The N,N'-dinitroso-N-ethyl-N'-phenyl-p-phenylenediamine, after drying and recrystallizing from isopropanol, melted at 94–95° C. It contained 20.2% nitrogen as compared to 20.7% calculated for $C_{14}H_{14}N_4O_2$.

A mixture of 10 grams of N-methyl-N'-phenyl-p-phenylenediamine, 100 ml. of methyl alcohol and 10 ml. of concentrated hydrochloric acid was cooled to 0–5° C. and to it added 10 grams of sodium nitrite dissolved in 15 ml. of water. After the addition of the nitrite the reaction mixture was stirred for one hour, 50 ml. of water added and the product filtered from solution, washed and dried. N,N'-dinitroso-N-methyl-N'-phenyl-p-phenylenediamine, after recrystallizing from isopropanol, melted at 111–112° C. It contained 21.5% nitrogen as compared to 21.9% calculated for $C_{13}H_{12}N_4O_2$.

Employing in the foregoing procedure described for the N-methyl amine, 30 grams of N-heptyl-N'-phenyl-p-phenylenediamine, 150 ml. of methanol, 35 ml. of concentrated hydrochloric acid and 25 grams of sodium nitrite in 35 ml. of water yielded N,N'-dinitroso-N-heptyl-N'-phenyl-p-phenylenediamine, M.P. 69–70° C. After recrystallizing from isopropanol, the melting point was 79–80° C. It contained 16.2% nitrogen as compared to 16.5% calculated for $C_{19}H_{24}N_4O_2$.

A mixture of 35 grams of N-sec. butyl-N'-phenyl-p-phenylenediamine, 200 ml. of methanol and 40 ml. of concentrated hydrochloric acid was cooled to 0–5° C. and treated with a solution of 30 grams of sodium nitrite in 50 ml. of water over a 15 minute period. The reaction mixture was then allowed to come to room temperature over a period of 30 minutes and decanted into 500 ml. of water. The oily layer was separated and dried in ether over sodium sulfate. The ether was then stripped off to yield N,N'-dinitroso-N-sec. butyl-N'-phenyl-p-phenylenediamine in 89.7% yield. The product solidified on standing, M.P. 57–58° C.

The compounds of this invention are valuable for use in the processing of vulcanizable rubbers and for the manufacture of vulcanized rubber articles resistant to degradation. Incorporating these adjuvants in amounts ranging from 0.1%–10.0% contributes a number of valuable properties. The compounds are valuable for controlling the vulcanization of sulfur vulcanizable rubbers, especially in combination with sulfenamide accelerators. Moreover, the vulcanizates resist ozone degradation which property results from having incorporated the nitrosoamine. The compounds also protect rubber stocks, both natural and synthetic, from aging. They may be used in conjunction with aliphatic or alicyclic amines, as for example dicyclohexylamine, dicyclohexylamine acetate and dicyclohexylamine stearate. Such combinations exert a synergistic action against degration of the rubber.

It is intended to cover all changes and modifications of the examples of the invention herein chosen for purposes of disclosure which do not constitute departures from the spirit and scope of the invention.

This application is a continuation-in-part of application Serial No. 444,347, filed July 19, 1954, now abandoned.

What is claimed is:

1. A compound of the structure

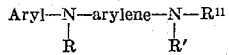

where R and R' are selected from a group consisting of hydrogen and nitroso radicals at least one of which is nitroso and R'' is selected from the group consisting of alkyl, cyclopentyl, cyclohexyl, alkyl substituted cyclohexyl and benzyl, the arylene radical is a 1,4-arylene radical selected from the group consisting of phenylene and naphthalene and the aryl radical is selected from a group consisting of phenyl, naphthyl, lower alkoxy substituted phenyl and lower alkyl substituted phenyl.

2. A compound of the structure

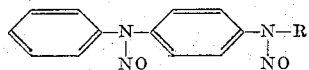

where R represents a lower alkyl radical.

3. N,N'-dinitroso N-isobutyl N'-phenyl-p-phenylenediamine.

4. N-mononitroso N-cyclohexyl N'-phenyl-p-phenylenediamine.

5. N,N' - dinitroso - N - isoproyl - N' - phenyl - p-phenylenediamine.

6. N,N' - dinitroso - N - phenyl - N' - cyclohexyl - p-phenylenediamine.

7. N,N' - dinitroso - N - methyl - N' - phenyl - p - phenylenediamine.

8. N,N' - dinitroso - N - β - naphthyl - N' - cyclohexyl-p-phenylenediamine.

No references cited.